W. F. KOLARIK.
ANIMAL WEANING DEVICE.
APPLICATION FILED FEB. 17, 1921.

1,400,750.

Patented Dec. 20, 1921.

Inventor
W. F. Kolarik
By J. D. Bryant
Attorney

UNITED STATES PATENT OFFICE.

WENCEL F. KOLARIK, OF OMENA, MICHIGAN.

ANIMAL-WEANING DEVICE.

1,400,750.   Specification of Letters Patent.   Patented Dec. 20, 1921.

Application filed February 17, 1921. Serial No. 445,835.

*To all whom it may concern:*

Be it known that I, WENCEL F. KOLARIK, a citizen of the United States of America, residing at Omena, in the county of Leelanau and State of Michigan, have invented certain new and useful Improvements in Animal-Weaning Devices, of which the following is a specification.

This invention relates to certain new and useful improvements in animal weaning devices particularly adapted for use in connection with calves so as to permit the animal to graze or eat food from a receptacle or the like, while preventing access to the mother animal.

The principal object of the invention is to greatly simplify devices of this character so that the same may be cheaply and easily manufactured as well as readily placed into use.

Another object of the invention is to provide side prodding bars with yieldable free end portions or members of blunt formation so as to avoid injury of the mother animal as is experienced incident to the use of spurs and the like embodied in prior devices of this character.

With the above general objects in view, and others that will become apparent as the nature of the invention is better understood, the same consists in the novel form, combination and arrangement of parts hereinafter more fully described in connection with the accompanying drawings and in which like reference characters indicate corresponding parts throughout the several views.

Figure 1:
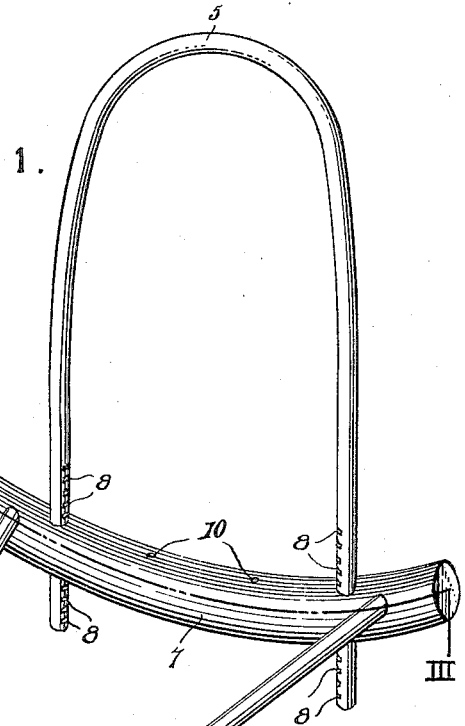
Figure 1 is a perspective view of a weaning device constructed in accordance with the present invention.

Referring more in detail to the several views, the present invention embodies an inverted U-shaped member or neck yoke 5 with its ends slidably passing through transverse openings 6 provided in the end portions of a throat bar 7, the inner sides of the ends of the yoke 5 being provided with a series of notches 8 adapted to be selectively engaged with the sliding latches 9 for holding the yoke 5 in a desired adjustable relation to the throat bar 7. The latches 9 are in the form of sliding bolts having pin and slot guiding means 10 and disposed in a recess 11 of the throat bar 7, a compression spring 12 being interposed between the two latches to normally project them into the notches 8. Each latch 9 is provided with an outwardly extending finger piece 13 so that when the finger pieces are pressed toward each other, both of the latches 9 will be simultaneously released from the opposite ends of the yoke 5 for permitting adjustment of the latter relative to the throat bar 7. It will, of course, be seen that by adjusting the yoke 5 relative to the throat bar 7, the opening bounded by these members will be correspondingly increased or diminished in size so as to comfortably fit the neck of the animal.

A pair of prodding bars 14 are fixed to the throat bar 7 at their rear ends, one bar 14 being fixed in each end of the throat bar 7 in any suitable manner so that the bars 14 converge forwardly and are disposed to lie at the sides of the animal's nose as well as to project forwardly beyond the same. As shown, the ends of the prodding bars 14 are inserted in sockets 15 provided in the ends of the throat bar 7, and they are retained in place by means of nails or other fastening devices 16.

Figure 2:
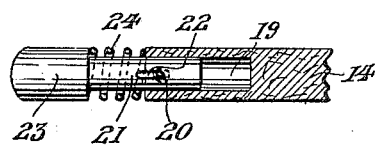
Fig. 2 is a fragmentary detail view drawn on a larger scale and shown partly in longitudinal section along the line II—II of Fig. 1.
Figure 3:
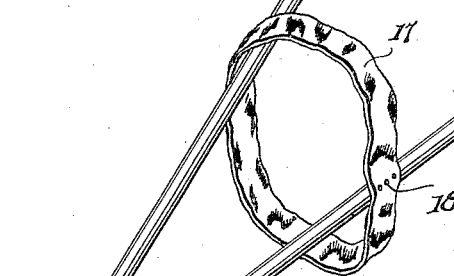
Fig. 3 is a longitudinal sectional view of the throat bar and adjacent parts taken upon the line III—III of Fig. 1.
Figure 3:
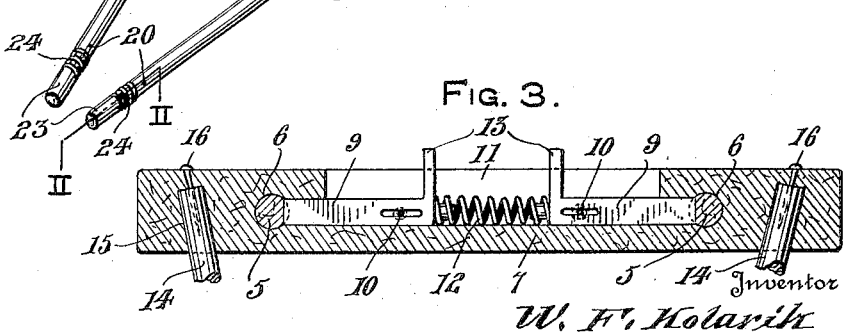

A nose ring or loop 17 is secured as at 18 to the intermediate portions of the prodding bars 14 for reception of the nose of the animal so as to properly hold the device with the bar 14 extending along the side of the animal's nose. The forward ends of the bars 14 are preferably socketed as at 19, and a transverse pin 20 extends transversely through each socket 19 with its ends rigidly fixed to the bar 14. A stem 21 is slidably disposed in each socket 19, and this stem is provided with a longitudinally elongated slot 22 through which the pin 20 projects for limiting the sliding movement of the stem 21. The stem 21 is integral with a blunt ended prodding member 23 which preferably consists of a head upon the outer end of the stem 21, and this head is normally pressed outwardly by means of a spring 24 which is interposed between the end edge of the rod 14 and the head 23 as shown in Fig. 2, the spring 24 being preferably of helical form and surrounding the stem 21.

It will be seen that the present device is of extremely simple and durable construction as well as capable of being readily adjusted to animals of different sizes, and it would also be seen that the prodding members 21, 23 will readily yield upon engaging the mother animal so as to avoid injuring her, while at the same time taking her by sufficient surprise to scare her away. It is believed that the construction and operation of the present invention, as well as the advantages thereof, will be readily understood and appreciated from the foregoing description by those skilled in the art.

Minor changes may be made without departing from the spirit and scope of the invention as claimed.

What is claimed as new is:

An animal weaning device comprising a throat bar, a neck yoke having its ends slidable through said throat bar, means to retain the yoke against sliding movement relative to the throat bar when in any of its adjusted positions, a pair of side prodding bars rigid with and projecting forwardly from said throat bar, said yoke being provided with a series of notches, said retaining means including a pair of sliding bolts carried by the throat bar and engageable in the notches of the yoke and a single spring for normally causing said bolts to engage in said notches.

In testimony whereof I affix my signature in presence of two witnesses.

WENCEL F. KOLARIK.

Witnesses:
G. S. WHITMORE,
CLARA RUFLI.